United States Patent
Yoshino et al.

(10) Patent No.: US 11,324,081 B2
(45) Date of Patent: May 3, 2022

(54) INDUCTIVE HEATING COOKER

(71) Applicants: Mitsubishi Electric Corporation, Tokyo (JP); MITSUBISHI ELECTRIC HOME APPLIANCE CO., LTD., Fukaya (JP)

(72) Inventors: Hayato Yoshino, Tokyo (JP); Ikuro Suga, Tokyo (JP); Jun Bunya, Tokyo (JP); Yuichiro Ito, Tokyo (JP); Takeshi Iida, Tokyo (JP)

(73) Assignees: Mitsubishi Electric Corporation, Tokyo (JP); Mitsubishi Electric Home Appliance Co., Ltd., Fukaya (JP)

( * ) Notice: Subject to any disclaimer, the term of this patent is extended or adjusted under 35 U.S.C. 154(b) by 282 days.

(21) Appl. No.: 16/344,954

(22) PCT Filed: Jan. 27, 2017

(86) PCT No.: PCT/JP2017/002954
§ 371 (c)(1),
(2) Date: Apr. 25, 2019

(87) PCT Pub. No.: WO2018/138872
PCT Pub. Date: Aug. 2, 2018

(65) Prior Publication Data
US 2020/0084842 A1 Mar. 12, 2020

(51) Int. Cl.
*H05B 6/12* (2006.01)
*H02J 50/80* (2016.01)
(Continued)

(52) U.S. Cl.
CPC ............ *H05B 6/1236* (2013.01); *H02J 50/12* (2016.02); *H02J 50/40* (2016.02); *H02J 50/80* (2016.02)

(58) Field of Classification Search
CPC ....... H05B 6/1236; H05B 6/062; H02J 50/80; H02J 50/12; H02J 50/40
See application file for complete search history.

(56) References Cited

U.S. PATENT DOCUMENTS

| 10,177,817 B2 * | 1/2019 | Ichikawa ............. H04B 5/0093 |
| 2007/0029936 A1 * | 2/2007 | Baarman ................. H01J 61/56 |
| | | 315/46 |

(Continued)

FOREIGN PATENT DOCUMENTS

| EP | 2456039 A2 | 5/2012 |
| EP | 3364718 A1 | 8/2018 |

(Continued)

OTHER PUBLICATIONS

International Search Report of the International Searching Authority dated Apr. 4, 2017 for the corresponding International application No. PCT/JP2017/002954 (and English translation).

(Continued)

*Primary Examiner* — Daniel Cavallari
*Assistant Examiner* — Brian K Baxter
(74) *Attorney, Agent, or Firm* — Posz Law Group, PLC

(57) ABSTRACT

An inductive heating cooker includes a main body and a power-receiver device. The main body includes a top plate on which a heating target is placed, a heating coil provided under the top plate and configured to inductively heat the heating target, a drive circuit configured to supply electric power to the heating coil, a power transmission coil configured to transmit the electric power by magnetic resonance, and a power transmission circuit configured to supply the electric power to the power transmission coil. The power-receiver device includes a power reception coil configured to receive the electric power from the power transmission coil by the magnetic resonance, and a load circuit (Continued)

configured to operate by the electric power received by the power reception coil.

14 Claims, 12 Drawing Sheets

(51) Int. Cl.
*H02J 50/12* (2016.01)
*H02J 50/40* (2016.01)

(56) References Cited

U.S. PATENT DOCUMENTS

| | | | |
|---|---|---|---|
| 2011/0011851 A1* | 1/2011 | Kataoka | H05B 6/1272 219/622 |
| 2012/0228956 A1 | 9/2012 | Kamata | |
| 2014/0332523 A1* | 11/2014 | Yaman | H05B 6/12 219/621 |
| 2015/0160307 A1* | 6/2015 | Kim | G01R 33/0005 324/253 |
| 2015/0163864 A1* | 6/2015 | Baarman | H05B 6/1236 99/358 |
| 2015/0245416 A1* | 8/2015 | Yoshino | H05B 6/1209 99/358 |
| 2016/0150597 A1* | 5/2016 | Yun | H05B 6/065 219/624 |
| 2016/0352154 A1 | 12/2016 | Matsui et al. | |
| 2017/0155283 A1 | 6/2017 | Akuzawa et al. | |
| 2018/0309327 A1* | 10/2018 | Miyamoto | G01V 3/101 |
| 2018/0313700 A1* | 11/2018 | Pooley | G01K 7/38 |

FOREIGN PATENT DOCUMENTS

| | | | |
|---|---|---|---|
| JP | 2010-049959 A | 3/2010 | |
| JP | 2012-200136 A | 10/2012 | |
| JP | 3363239 B2 | 1/2013 | |
| JP | 5738497 B1 | 5/2015 | |
| JP | 2016-125992 A | 7/2016 | |
| JP | 2016-134355 A | 7/2016 | |
| JP | 5992131 B1 | 8/2016 | |
| WO | 2015/125276 A1 | 8/2015 | |
| WO | 2016/054019 A1 | 4/2016 | |

OTHER PUBLICATIONS

Partial Supplementary European Search Report dated Dec. 16, 2019 issued in corresponding EP patent application No. 17894319.7.
Extended European Search Report dated Feb. 17, 2021, issued in corresponding European Patent Application No. 20200003.0.
European Extended Search Report dated Mar. 19, 2020 issued in the corresponding EP patent application No. 17894319.7.

* cited by examiner

INDUCTIVE HEATING COOKER

CROSS REFERENCE TO RELATED APPLICATION

This application is a U.S. national stage application of PCT/JP2017/002954 filed on Jan. 27, 2017, the contents of which are incorporated herein by reference.

TECHNICAL FIELD

The present invention relates to an inductive heating cooker that performs non-contact power transmission using a magnetic resonance method.

BACKGROUND ART

An inductive heating cooker has been proposed in which a temperature detection unit is provided to a top plate. The inductive heating cooker includes a first coil provided at a bottom surface of the top plate, and a second coil provided in the temperature detection unit. When the second coil is provided to face the first coil, the first coil is coupled to the second coil by electromagnetic inductive coupling. Thus, the electric power is supplied from the first coil to the second coil.

CITATION LIST

Patent Literature

Patent Literature 1: Japanese Unexamined Patent Application Publication No. 2010-49959

SUMMARY OF INVENTION

Technical Problem

In the existing inductive heating cooker, the electric power is supplied by the electromagnetic inductive coupling. Thus, a power reception coil (second coil) provided in a power-receiver device (temperature detection unit) needs to face a power transmission coil (first coil) for supplying the electric power, which results in restriction on the installation position of the power-receiver device.

The present invention has been made to solve the above-described problem, and an object of the present invention is to obtain an inductive heating cooker in which the electric power is transmitted from a main body to a power-receiver device, the inductive heating cooker being capable of alleviating restriction on an installation position of the power-receiver device.

Solution to Problem

An inductive heating cooker of an embodiment of the present invention includes a main body and a power-receiver device. The main body includes a top plate on which a heating target is placed, a heating coil provided under the top plate and configured to inductively heat the heating target, a drive circuit configured to supply electric power to the heating coil, a power transmission coil configured to transmit the electric power by magnetic resonance, and a power transmission circuit configured to supply the electric power to the power transmission coil. The power-receiver device includes a power reception coil configured to receive the electric power from the power transmission coil by the magnetic resonance, and a load circuit configured to operate by the electric power received by the power reception coil.

Advantageous Effects of Invention

An inductive heating cooker of an embodiment of the present invention includes a main body having a power transmission coil configured to transmit the electric power by magnetic resonance, and a power-receiver device having a power reception coil configured to receive the electric power from the power transmission coil by the magnetic resonance. Consequently, the restriction on an installation position of the power-receiver device can be alleviated.

DESCRIPTION OF EMBODIMENTS

Embodiment 1

(Configuration)

Figure 1:
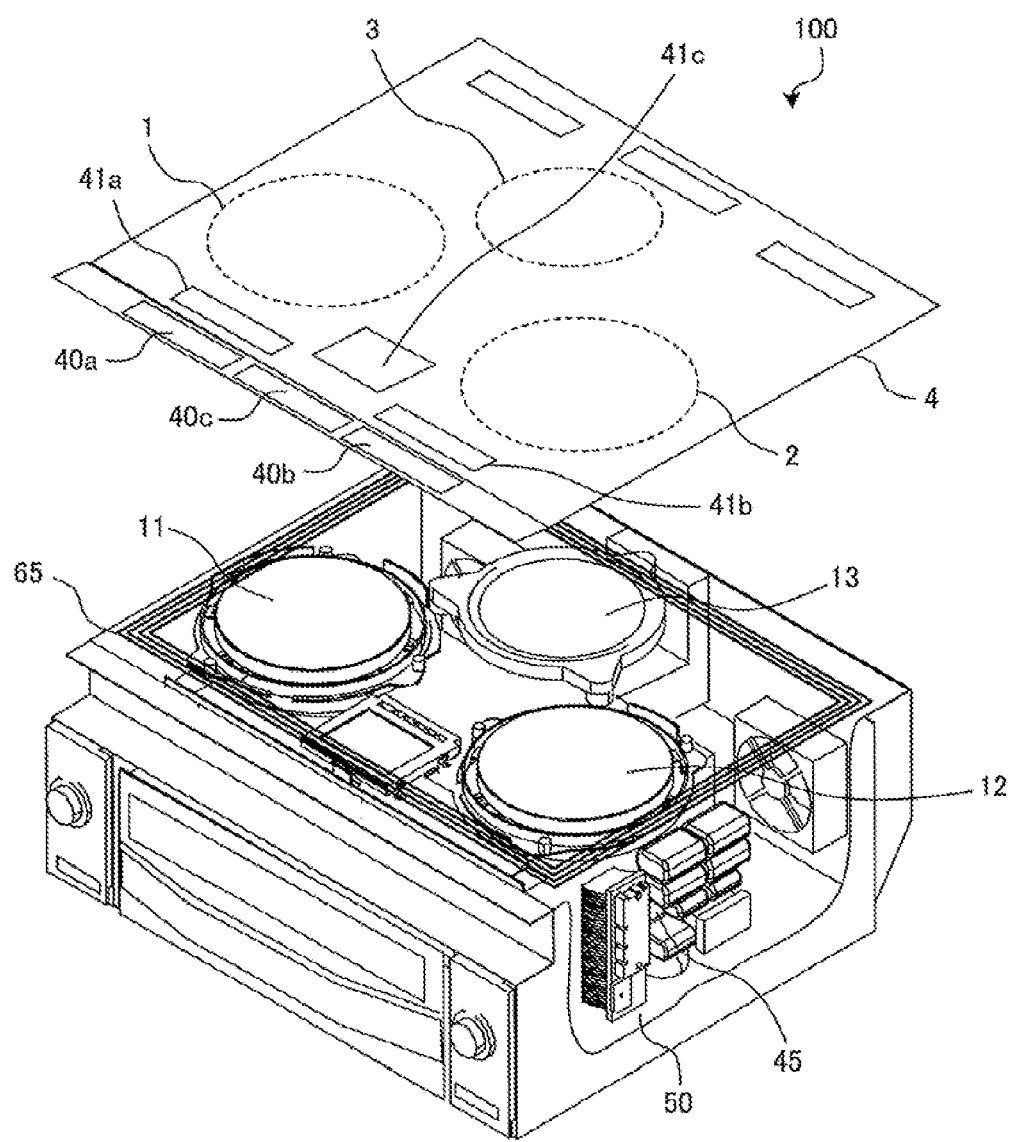
FIG. 1 is an exploded perspective view illustrating a main body of an inductive heating cooker according to Embodiment 1.

FIG. 1 is an exploded perspective view illustrating a main body of an inductive heating cooker according to Embodiment 1.

Figure 2:
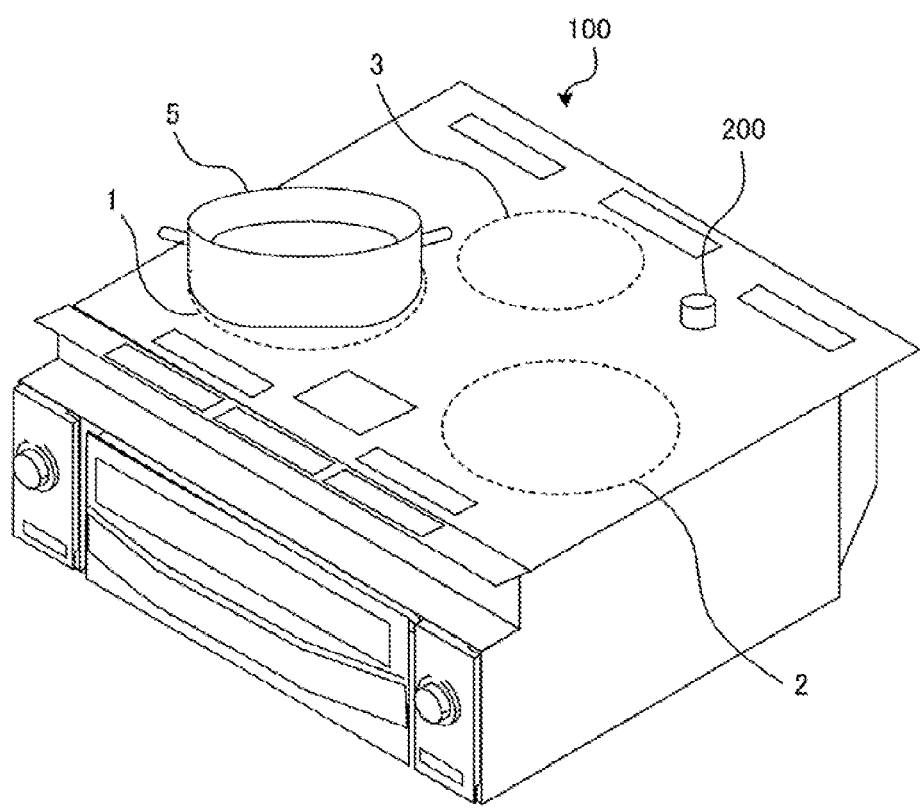
FIG. 2 is a perspective view illustrating the main body and a power-receiver device of the inductive heating cooker according to Embodiment 1.

FIG. 2 is a perspective view illustrating the main body and a power-receiver device of the inductive heating cooker according to Embodiment 1.

As illustrated in FIG. 1 and FIG. 2, an upper portion of a main body 100 of the inductive heating cooker includes a top plate 4 on which a heating target 5 such as a pot is placed. A power-receiver device 200 to which the electric power is transmitted from the main body 100 is placed on the top plate 4 and is allowed to be detached from the top plate 4. In the inductive heating cooker according to Embodiment 1, the power-receiver device 200 includes a temperature sensor configured to detect a temperature of the heating target 5. The details will be described later.

The top plate 4 of the main body 100 includes a first heating area 1, a second heating area 2, and a third heating area 3 as heating areas for inductively heating the heating target 5. A first heating unit 11, a second heating unit 12, and a third heating unit 13 are provided to correspond to the respective heating areas. The main body 100 is configured to enable inductive heating of the heating target 5 placed on one of the heating areas.

In Embodiment 1, the first heating unit 11 and the second heating unit 12 are provided to be laterally aligned close to the front of the main body 100, and the third heating unit 13 is provided substantially at the center of the main body 100 close to the rear of the main body 100. Note that the arrangement of the heating areas is not limited to the one described above. For example, the three heating areas may be arranged to be aligned laterally in a substantially linear manner. Furthermore, the first heating unit 11 and the second heating unit 12 may be provided in such a manner that the respective centers of the first heating unit 11 and the second heating unit 12 are different in position in the depth direction. The number of heating areas is not limited to three, and may be one or two, or four or more.

The whole of top plate 4 is made of an infrared transmitting material such as heat-resistant reinforced glass, crystallized glass, and borosilicate glass. The top plate 4 is fixed to an outer circumference of an upper opening of the main body 100 by use of a rubber packing or sealing material interposed between the top plate 4 and the main body 100 in such a manner that the outer circumference of the upper opening of the main body 100 is impermeable to water. On the top plate 4, circular pot position marks roughly indicating pot placement positions are formed by painting or printing, for example, corresponding to respective heating ranges (the heating areas) of the first heating unit 11, the second heating unit 12, and the third heating unit 13.

An operation unit 40a, an operation unit 40b, and an operation unit 40c (hereinafter occasionally collectively referred to as the operation units 40) are provided close to the front of the top plate 4 as input devices each for setting heating power to be input (electric power to be input) and a cooking menu (such as boiling mode and frying mode) when the heating target 5 is heated by the corresponding one of the first heating unit 11, the second heating unit 12, and the third heating unit 13. Furthermore, a display unit 41a, a display unit 41b, and a display unit 41c (hereinafter occasionally collectively referred to as the display units 41) for displaying information such as the operating state of the main body 100 and details of inputs and operations sent from the operation units 40 are provided close to the operation units 40.

Note that the configurations of the operation units 40a to 40c and the display units 41a to 41c are not limited to particular configurations. For example, the operation units 40a to 40c and the display units 41a to 41c may be provided for the respective heating areas, or an operation unit 40 and a display unit 41 may be provided for the heating areas as a whole. Note that the operation units 40a to 40c are made of mechanical switches, such as push switches and tactile switches, or touch switches that detect an input operation through a change in capacitance of an electrode, for example. Furthermore, the display units 41a to 41c are made of liquid crystal devices (LCDs) or LEDs, for example.

Note that the following description will be given of a case in which a display-and-operation unit 43 configured in such a manner that the operation units 40 and the display units 41 are integrated is provided. The display-and-operation unit 43 is made of a touch panel having touch switches arranged on an upper surface of an LCD, for example.

Under the top plate 4, the main body 100 accommodates the first heating unit 11, the second heating unit 12, and the third heating unit 13, each of which is made of a heating coil. Note that at least one of the first heating unit 11, the second heating unit 12, and the third heating unit 13 may be made of an electric heater configured to perform radiation heating, for example (a nichrome wire, a halogen heater, or a radiant heater, for example).

The heating coil is formed by winding a conductive wire made of a given metal (copper or aluminum, for example) and coated with an insulating film. Each of the heating coils is supplied with a high-frequency power by drive circuits 50, and thereby generates a high-frequency magnetic field.

The main body 100 of the inductive heating cooker accommodates the drive circuits 50 configured to supply the high-frequency power to the heating coils of the first heating unit 11, the second heating unit 12, and the third heating unit 13, and a control unit 45 configured to control the operation of the entire inductive heating cooker including the drive circuits 50.

A power transmission coil 65 configured to transmit the electric power to the power-receiver device 200 by magnetic resonance is provided under the top plate 4 of the main body 100. The power transmission coil 65 is formed by winding a conductive wire made of a given metal (copper or aluminum, for example) and coated with an insulating film. The inductance of the power transmission coil 65 is smaller than that of the heating coil.

As illustrated in FIG. 1, the power transmission coil 65 is provided along an edge of the top plate 4, for example. The power transmission coil 65 is provided to surround the first heating unit 11, the second heating unit 12, and the third heating unit 13, in a plan view. Thus, a range can be increased in which one power transmission coil 65 is provided in an area of the top plate 4 in which the heating units are not provided.

Note that the shape and arrangement of the power transmission coil 65 are not limited to the ones described above. For example, the power transmission coil 65 may be provided to surround one heating unit (heating coil) in a plan view. Furthermore, a plurality of power transmission coils 65 may be provided.

Figure 3:
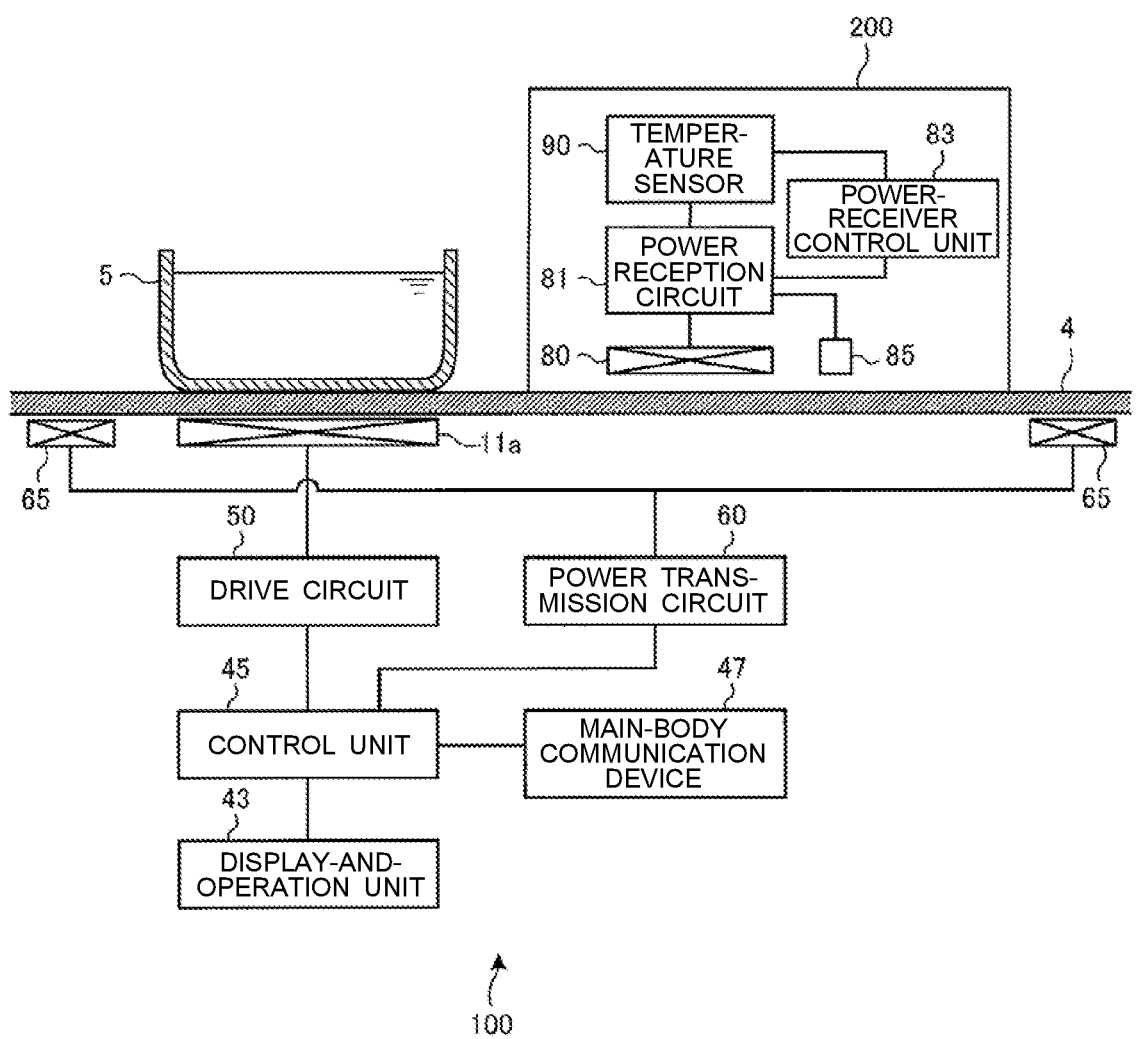
FIG. 3 is a block diagram illustrating a configuration of the main body and the power-receiver device of the inductive heating cooker according to Embodiment 1.

FIG. 3 is a block diagram illustrating a configuration of the main body and the power-receiver device of the inductive heating cooker according to Embodiment 1.

FIG. 3 illustrates a state in which the heating target 5 is placed on one of the heating areas on the top plate 4 of the main body 100 of the inductive heating cooker, and the power-receiver device 200 is placed on an area of the top plate 4 in which the heater areas are not provided.

A non-contact power transmission system includes the main body 100 of the inductive heating cooker serving as a non-contact power transmission device, and the power-receiver device 200.

As illustrated in FIG. 3, the heating coil 11a, the display-and-operation unit 43, the control unit 45, a main-body communication device 47, the drive circuits 50, a power transmission circuit 60, and the power transmission coil 65 are provided in the main body 100 of the inductive heating cooker.

The control unit 45 is made of a device such as a microcomputer and a digital signal processor (DSP). On the basis of information such as details of operations of the display-and-operation unit 43 and communication information received from the main-body communication device 47, the control unit 45 controls the drive circuits 50. The control unit 45 further displays information on the display-and-operation unit 43 depending on factors such as the operating state.

The main-body communication device 47 is made of a wireless communication interface conforming to a given communication standard, such as a wireless LAN, Bluetooth (registered trademark), infrared communication, and near field communication (NFC), for example. The main-body communication device 47 conducts wireless communication with a power-receiver communication device 85 of the power-receiver device 200.

The power transmission circuit 60 supplies the electric power to the power transmission coil 65. The details will be described later.

The power-receiver device 200 placed, for example, on the top plate 4 receives the electric power from the main body 100 in a non-contact manner. The power-receiver device 200 includes a power reception coil 80, a power reception circuit 81, a power-receiver control unit 83, the power-receiver communication device 85, and a temperature sensor 90 serving as a load circuit.

The power reception coil 80 receives the electric power from the power transmission coil 65 through electromagnetic resonance. The power reception circuit 81 supplies the electric power received by the power reception coil 80 to a load. The details will be described later.

The power-receiver control unit 83, the power-receiver communication device 85, and the temperature sensor 90 are operated by the electric power supplied from the power reception circuit 81.

The temperature sensor 90 is made of an infrared ray sensor, for example, and detects the temperature of a side surface of the heating target 5 placed on the top plate 4 in a non-contact manner. Note that the temperature sensor 90 may be made of a contact type sensor such as a thermistor, for example. The temperature sensor 90 outputs a voltage signal corresponding to the detected temperature to the power-receiver control unit 83.

The power-receiver control unit 83 is made of a device such as a microcomputer and a digital signal processor (DSP). The power-receiver control unit 83 causes the temperature sensor 90 to transmit the information on the temperature detected by the temperature sensor 90 to the power-receiver communication device 85.

The power-receiver communication device 85 is made of a wireless communication interface conforming to the communication standard of the main-body communication device 47. The power-receiver communication device 85 conducts wireless communication with the main-body communication device 47.

Note that the temperature sensor 90 in Embodiment 1 corresponds to a "load circuit" in the present invention.

The power-receiver communication device 85 corresponds to a "first communication device" in the present invention.

The main-body communication device 47 corresponds to a "second communication device" in the present invention.

(Drive Circuit)

Figure 4:
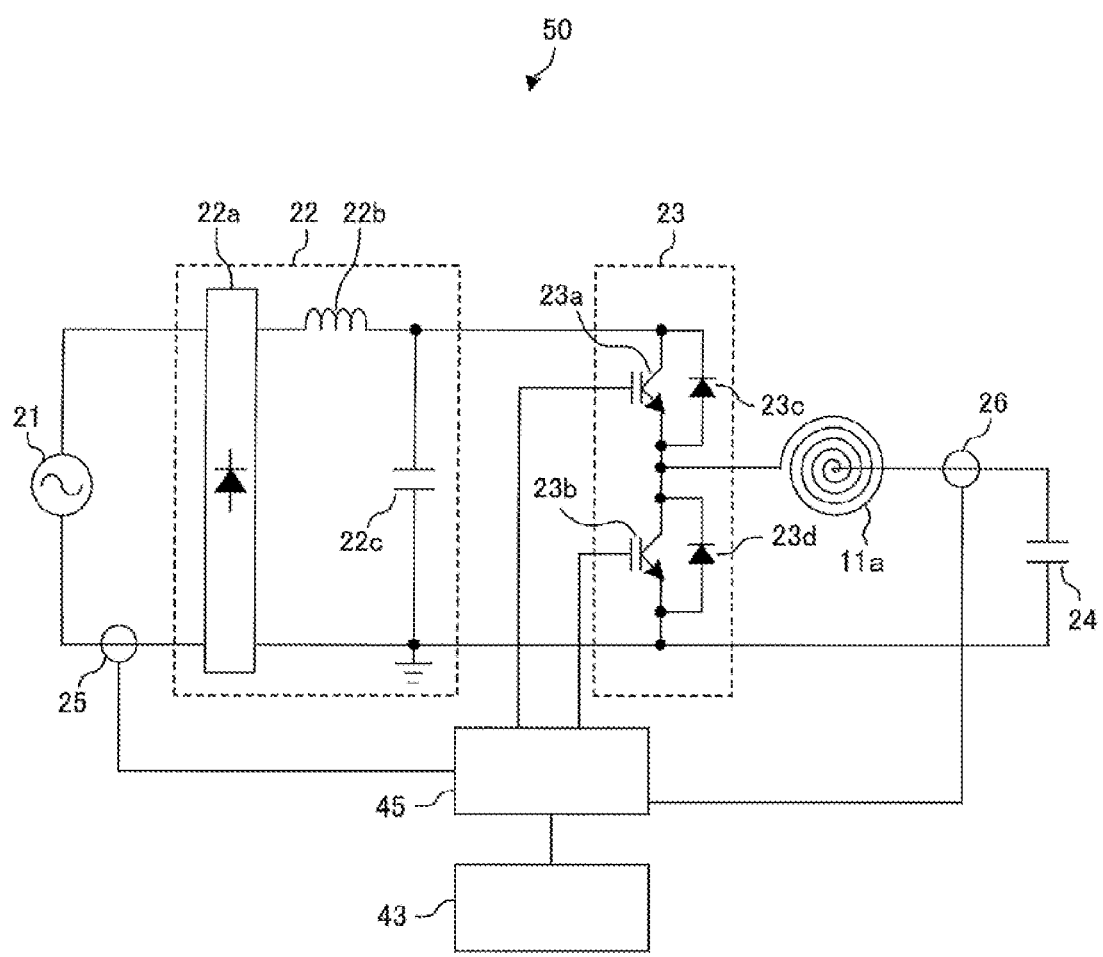
FIG. 4 is a diagram illustrating one of drive circuits of the inductive heating cooker according to Embodiment 1.

FIG. 4 is a diagram illustrating one of the drive circuits of the inductive heating cooker according to Embodiment 1.

Note that the drive circuits 50 are provided for the respective heating units. The drive circuits 50 may have the same circuit configuration, or may have different circuit configurations for the respective heating units. FIG. 4 illustrates only one of the drive circuits 50. As illustrated in FIG. 4, the drive circuit 50 includes a direct-current power supply circuit 22, an inverter circuit 23, and a resonant capacitor 24.

An input current detecting unit 25 is made of a current sensor, for example. The input current detecting unit 25 detects a current to be input to the direct-current power supply circuit 22 from an alternating-current power supply (commercial power supply) 21, and outputs a voltage signal corresponding to the value of the input current to the control unit 45.

The direct-current power supply circuit 22 includes a diode bridge 22a, a reactor 22b, and a smoothing capacitor 22c. The direct-current power supply circuit 22 converts an alternating-current voltage input to the direct-current power supply circuit 22 from the alternating-current power supply 21 into a direct-current voltage, and outputs the direct-current voltage to the inverter circuit 23.

The inverter circuit 23 is an inverter known as a half-bridge inverter, in which IGBTs 23a and 23b serving as switching elements are each connected in series with the corresponding one of outputs of the direct-current power supply circuit 22. In the inverter circuit 23, diodes 23c and 23d are connected in parallel with the IGBTs 23a and 23b, respectively, as flywheel diodes. The IGBTs 23a and 23b are driven on and off by a drive signal output from the control unit 45. The control unit 45 outputs the drive signal to alternately turn on and off the IGBTs 23a and 23b by placing the IGBT 23b in the off state when the IGBT 23a is turned on and placing the IGBT 23b in the on state when the IGBT 23a is turned off. The inverter circuit 23 thereby converts the direct-current power output from the direct-current power supply circuit 22 into alternating-current power having a specified frequency, and supplies the electric power to a resonant circuit made of the heating coil 11a and the resonant capacitor 24. Note that the alternating-current power having a specified frequency is alternating-current power having a high frequency ranging from equal to or more than 20 kHz to less than 100 kHz.

With the resonant capacitor 24 connected in series with the heating coil 11a, the resonant circuit has a resonant frequency corresponding to factors such as the inductance of the heating coil 11a and the capacitance of the resonant capacitor 24. When magnetic coupling with the heating target 5 (a metal load) is made, the inductance of the heating coil 11a changes depending on characteristics of the metal load, and the resonant frequency of the resonant circuit changes depending on the change in the inductance.

With the drive circuit 50 configured in this manner, a high-frequency current of approximately tens of amperes flows through the heating coil 11*a*, and the heating target 5 placed on a part of the top plate 4 immediately above the heating coil 11*a* is inductively heated by a high-frequency magnetic flux produced by the flowing high-frequency current.

Note that each of the IGBTs 23*a* and 23*b* serving as a switching element is made of a semiconductor made of a silicon-based material, for example, but may be made of a wideband gap semiconductor made of a material such as a silicon carbide-based material and a gallium nitride-based material. The use of the wideband gap semiconductor as the switching element enables power supply loss of the switching element to be reduced, and favorable heat transfer from the drive circuit 50 to be achieved even when the switching frequency (driving frequency) is increased to a high frequency (high speed). Consequently, it is possible to reduce the size of heat transfer fins of the drive circuit 50, and thus to reduce the size and cost of the drive circuit 50.

A coil current detecting unit 26 is connected to the resonant circuit made of the heating coil 11*a* and the resonant capacitor 24. The coil current detecting unit 26 is made of a current sensor, for example. The coil current detecting unit 26 detects the current flowing through the heating coil 11*a* and outputs a voltage signal corresponding to the value of the coil current to the control unit 45.

Note that FIG. 4 illustrates the half-bridge drive circuit, but it is needless to say that a full-bridge drive circuit made of four IGBTs and four diodes may be used.

(Power Transmission Using Magnetic Resonance Method)

Figure 5:
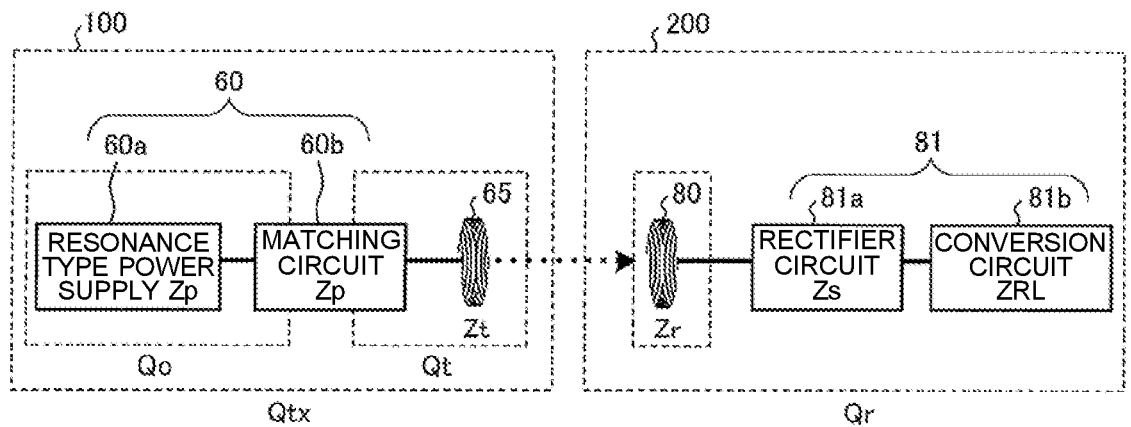
FIG. 5 is a diagram illustrating a configuration of the main body and the power-receiver device of the inductive heating cooker according to Embodiment 1.
Figure 6:
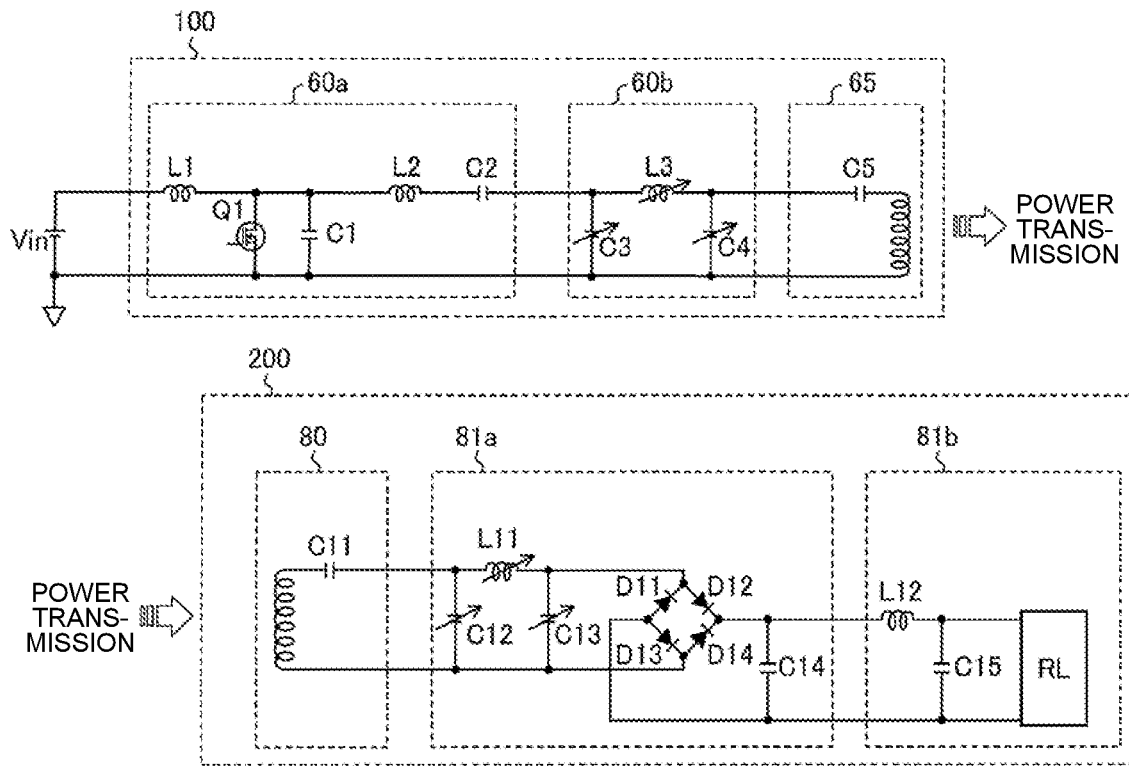
FIG. 6 is a specific circuit diagram of a configuration of FIG. 5.

FIG. 5 is a diagram illustrating a configuration of the main body and the power-receiver device of the inductive heating cooker according to Embodiment 1. FIG. 6 is a specific circuit diagram of a configuration of FIG. 5.

Note that FIG. 5 and FIG. 6 each illustrate a configuration relating to power transmission using a magnetic resonance method, of the main body 100 and the power-receiver device 200 of the inductive heating cooker.

The main body 100 and the power-receiver device 200 of the inductive heating cooker form a non-contact power transmission system adopting a magnetic resonance method (resonant coupling type) of performing power transmission using the resonance characteristics. More specifically, the main body 100 of the inductive heating cooker forms a resonance type power transmission device that transmits the electric power to the power-receiver device 200 by magnetic resonance. The power-receiver device 200 is a resonance type power-receiver device that receives the electric power from the main body 100 by magnetic resonance.

As illustrated in FIG. 5 and FIG. 6, the power transmission circuit 60 of the main body 100 includes a resonance type power supply 60*a* and a matching circuit 60*b*.

The resonance type power supply 60*a* controls the supply of electric power to the power transmission coil 65, converts direct current or alternating current input power into an alternating current having a predetermined frequency, and outputs this alternating current. This resonance type power supply 60*a* is made of a power supply circuit having a resonance switching method, and has an output impedance Zo, a resonance frequency fo, and a resonance characteristic value Qo.

The resonance frequency fo of the resonance type power supply 60*a* is set to a frequency in a MHz band.

The resonance frequency fo is 6.78 MHz, for example. Note that the resonance frequency fo is not limited to 6.78 MHz, and may be a frequency that is an integral multiple of 6.78 MHz in the MHz band.

The matching circuit 60*b* performs impedance matching the output impedance Zo of the resonance type power supply 60*a*, and the pass characteristic impedance Zt of the power transmission coil 65. This matching circuit 60*b* is made of a filter of π type or L type that includes inductors L and capacitors C, and has the pass characteristic impedance Zp of the filter.

The power transmission coil 65 receives the alternating current power from the resonance type power supply 60*a* via the matching circuit 60*b*, and performs a resonance operation to generate a non-radiative electromagnetic field in the vicinity of the power transmission coil 65, thereby transmitting the electric power to the power reception coil 80 of the power-receiver device 200. This power transmission coil 65 forms a resonance circuit including a coil and a capacitor C5, and serves as a resonance type antenna. The power transmission coil 65 has the pass characteristic impedance Zt, a resonance frequency ft, and a resonance characteristic value Qt.

Furthermore, the resonance frequency fo and the resonance characteristic value Qo of the resonance type power supply 60*a* are determined from the output impedance Zo of the resonance type power supply 60*a* and the pass characteristic impedance Zp of the matching circuit 60*b*. The resonance frequency ft and the resonance characteristic value Qt of the power transmission coil 65 are determined from the pass characteristic impedance Zt of the power transmission coil 65 and the pass characteristic impedance Zp of the matching circuit 60*b*.

It is then seen that the main body 100 of the inductive heating cooker has a resonance characteristic value Qtx of the following mathematic formula (1) on the basis of these two resonance characteristic values Qo and Qt.

[Math. 1]

$$Qtx = \sqrt{(Qo \cdot Qt)} \quad (1)$$

The power reception circuit 81 of the power-receiver device 200 includes a rectifier circuit 81*a*, and a conversion circuit 81*b*.

The power reception coil 80 receives the electric power by performing a resonant coupling operation of coupling with the non-radiative electromagnetic field from the power transmission coil 65, and outputs the alternating current power. This power reception coil 80 forms a resonance circuit including a coil and a capacitor C11, and serves as a resonance type antenna. The power reception coil 80 has the pass characteristic impedance Zr.

The rectifier circuit 81*a* is a matching rectifier circuit having a rectifying function of converting the alternating current power from the power reception coil 80 into direct current power, and a matching function of performing impedance matching the pass characteristic impedance Zr of the power reception coil 80 and the input impedance ZRL of the conversion circuit 81*b*. The matching function is performed by a filter of π type or L type that includes inductors L and capacitors C. The rectifier circuit 81*a* also has a pass characteristic impedance Zs. Although the rectifier circuit 81*a* having the rectifying function and the matching function is shown above, the rectifier circuit 81*a* is not limited to the one shown above, and can include only the rectifying function even though its rectifying efficiency drops.

The conversion circuit 81*b* receives the direct current power from the rectifier circuit 81*a*, and converts this direct current power into a predetermined voltage and supplies this predetermined voltage to a load circuit (temperature sensor 90 or other devices). This conversion circuit 81*b* is made of an LC filter (smoothing filter) for smoothing a high-frequency voltage ripple, a DC-DC converter for converting the direct current power into the direct current power having the predetermined voltage, and other devices, and has the input impedance ZRL of the conversion circuit 81*b*. As an alternative, the DC-DC converter can be eliminated, and the conversion circuit 81*b* can be made only of the smoothing filter.

Furthermore, the resonance characteristic value Qr and the resonance frequency fr of the power-receiver device 200 are determined from the pass characteristic impedance Zr of the power reception coil 80, the pass characteristic impedance Zs of the rectifier circuit 81*a*, and the input impedance ZRL of the conversion circuit 81*b*.

Then, the characteristic impedance of each of the functional units is set in such a manner that there is provided a correlation among the resonance characteristic value Qo of the resonance type power supply 60*a*, the resonance characteristic value Qt of the power transmission coil 65, and the resonance characteristic value Qr of the power-receiver device 200. More specifically, the resonance characteristic value Qtx ($=\sqrt{(Qo \cdot Qt)}$) of the main body 100 is made to approximate the resonance characteristic value Qr of the power-receiver device 200 (the following mathematic formula (2)).

More specifically, the resonance characteristic value of the main body 100 preferably falls within the range given by the following mathematic formula (3).

[Math. 2]

$$\sqrt{(Qo \cdot Qt)} \approx Qr \qquad (2)$$

[Math. 3]

$$0.5 Qr \leq \sqrt{(Qo \cdot Qt)} \leq 1.5 Qr \qquad (3)$$

Thus, the reduction in the power transmission efficiency can be decreased by providing a correlation among the three resonance characteristic values of the resonance characteristic value Qo of the resonance type power supply 60*a*, the resonance characteristic value Qt of the power transmission coil 65, and the resonance characteristic value Qr of the power-receiver device 200. Consequently, comparing the power transmission using the magnetic resonance method (resonant coupling type) with the power transmission using the electromagnetic induction method (electromagnetic induction coupling type), the distance between the power transmission coil 65 and the power reception coil 80 can be increased.

(Operation)

An operation of the inductive heating cooker of Embodiment 1 will be described below.

A user places the heating target 5 such as a pot on one of the heating areas of the top plate 4 of the main body 100.

The user also places the power-receiver device 200 on the top plate 4. When the temperature sensor 90 of the power-receiver device 200 is a non-contact type sensor such as an infrared ray sensor, for example, the user places the power-receiver device 200 at a given position on the top plate 4. When the temperature sensor 90 of the power-receiver device 200 is a contact type sensor such as a thermistor, for example, the user places the power-receiver device 200 on the top plate 4 in such a manner that the power-receiver device 200 contacts the side surface of the heating target 5. As described above, in the power transmission using the magnetic resonance method (resonant coupling type), the distance in which the electric power can be transmitted is long, and consequently the power-receiver device 200 need not to be provided to face the power transmission coil 65.

The user performs operation of starting heating (input heating power) with the display-and-operation unit 43.

The control unit 45 controls the inverter circuit 23 depending on the set electric power (heating power). High-frequency drive signals with a frequency of, for example, approximately 20 kHz to 100 kHz are input to the IGBTs 23*a* and 23*b* of the inverter circuit 23 and the IGBTs 23*a* and 23*b* are turned on and off alternately, thereby supplying a high-frequency current to the resonance circuit made of the heating coil 11*a* and the resonant capacitor 24. When the high-frequency current flows through the heating coil 11*a*, a high-frequency magnetic field is generated, eddy currents flow at a bottom of the heating target 5 in such a direction as to cancel off magnetic flux variations, and the heating target 5 is heated by losses due to the flowing eddy currents.

The control unit 45 operates the power transmission circuit 60 and causes the power transmission circuit 60 to start supply of the electric power to the power transmission coil 65. The electric power is thereby supplied from the power transmission coil 65 to the power reception coil 80 of the power-receiver device 200 by magnetic resonance. The electric power received by the power reception coil 80 is supplied from the power reception circuit 81 to the power-receiver control unit 83, the power-receiver communication device 85, and the temperature sensor 90.

The temperature sensor 90 of the power-receiver device 200 detects the temperature of the heating target 5. The power-receiver control unit 83 causes the temperature sensor 90 to transmit the information on the temperature detected by the temperature sensor 90 to the power-receiver communication device 85.

The main-body communication device 47 of the main body 100 receives the information on the temperature transmitted from the power-receiver communication device 85, and outputs this information to the control unit 45. The control unit 45 of the main body 100 controls the driving of the drive circuits 50 depending on the information on the temperature acquired from the temperature sensor 90 of the power-receiver device 200.

(Advantageous Effects)

As described above, in Embodiment 1, the main body 100 includes the top plate 4 on which the heating target 5 is placed, the heating coil 11*a* provided under the top plate 4 and configured to inductively heat the heating target 5, the drive circuit 50 configured to supply the electric power to the heating coil 11*a*, the power transmission coil 65 configured to transmit the electric power by magnetic resonance, and the power transmission circuit 60 configured to supply the electric power to the power transmission coil 65. Furthermore, the power-receiver device 200 includes the power reception coil 80 configured to receive the electric power from the power transmission coil 65 by the magnetic resonance, and the load circuit configured to operate by the electric power received by the power reception coil 80.

Comparing with the power transmission using the electromagnetic induction coupling, the restriction on an installation position of the power-receiver device 200 can thus be more alleviated, the power-receiver device 200 receiving the electric power from the main body 100 of the inductive heating cooker.

As the electric power is transmitted to the power-receiver device 200 from the main body 100 of the inductive heating cooker by magnetic resonance, the electric power can be transmitted even when the power transmission coil 65 and the power reception coil 80 are not arranged to face each other. Consequently, it is possible to increase the degree of freedom in the installation position of the power-receiver device 200 to be placed on the top plate 4 and improve the usability. With such a configuration as to transmit the electric power when the distance between the power transmission coil 65 and the power reception coil 80 is not less than half of the width or depth of the top plate 4, for example, the electric power can be stably transmitted even when the power-receiver device 200 is placed anywhere on the top plate. Consequently, it is possible to obtain an inductive heating cooker having the increased degree of freedom in the installation position of the power-receiver device 200 and the improved usability.

As the electric power can be transmitted even when the power transmission coil 65 and the power reception coil 80 are not arranged to face each other, a plurality of power transmission coils 65 need not be provided at respective positions at which the power-receiver device 200 is placed, and thus to obtain an inexpensive inductive heating cooker.

As the resonance frequency of the power transmission by magnetic resonance is largely different from the frequency of the coil current flowing through the heating coil 11a to perform inductive heating, the power transmission from the main body 100 to the power-receiver device 200 is not affected by the magnetic field generated by the coil current flowing through the heating coil 11a. The inductive heating of the heating target 5 and the power transmission to the power-receiver device 200 can be simultaneously performed.

In a case in which the electric power is transmitted using the electromagnetic induction coupling, for example, the frequency of the power transmission approximates the frequency of the coil current flowing through the heating coil 11a. As a result, the interference occurs between the magnetic field of the power transmission using the electromagnetic induction coupling and the magnetic field generated from the heating coil 11a, which may cause the malfunction. Consequently, in a case in which the electric power is transmitted using the electromagnetic induction coupling, it is difficult to simultaneously perform the inductive heating and the power transmission. Consequently, in a case in which the electric power is transmitted using the electromagnetic induction coupling, it is necessary to reduce the electric power to be input for the inductive heating or to temporarily stop the inductive heating.

On the other hand, in the inductive heating cooker of Embodiment 1, the electric power is transmitted by magnetic resonance, and consequently it is not necessary to reduce the electric power to be input for the inductive heating or to stop the inductive heating. Consequently, it is possible to obtain an inductive heating cooker with which food can be cooked in a short time and having the improved usability.

In a case in which the electric power is transmitted using the electromagnetic induction coupling, for example, significant reduction in the power transmission efficiency is caused when the displacement occurs between the position of the power transmission coil and the position of the power reception coil. Consequently, in the power transmission using the electromagnetic induction coupling, excessive current flows through the power transmission coil, which results in greater heat generation in the power transmission coil. When the positional displacement is further larger, the electric power cannot be transmitted to the power-receiver device.

On the other hand, in the inductive heating cooker of Embodiment 1, the electric power is transmitted by magnetic resonance, and consequently the electric power can be stably transmitted even when the displacement occurs between the position of the power transmission coil 65 and the position of the power reception coil 80, that is, the power transmission coil 65 and the power reception coil 80 are not arranged to face each other.

In Embodiment 1, the power transmission coil 65 is provided to surround a plurality of heating units in a plan view. For example, the power transmission coil 65 is provided under the top plate 4 and along the edge of the top plate 4.

Thus, a range can be increased in which one power transmission coil 65 is provided in an area of the top plate 4 in which the heating units are not provided. As the resonance frequency of the power transmission by magnetic resonance is largely different from the driving frequency of the heating coil 11a, the power transmission from the main body 100 to the power-receiver device 200 is not affected by the magnetic field generated by the coil current flowing through the heating coil 11a even when the power transmission coil 65 is provided to surround the heating coil 11a.

In a case in which the electric power is transmitted using the electromagnetic induction coupling, for example, the frequency of the coil current flowing through the heating coil approximates the frequency of the power transmission, and consequently the power transmission from the main body to the power-receiver device is more likely to be affected by the magnetic field generated by the coil current flowing through the heating coil. Consequently, in a case in which the electric power is transmitted using the electromagnetic induction coupling, it is necessary to provide the power transmission coil for the power transmission at a position at which the heating coil is not provided, thereby restricting the installation position of the power transmission coil.

On the other hand, in the inductive heating cooker of Embodiment 1, the electric power is transmitted by magnetic resonance, and consequently it is possible to alleviate restriction on an installation position of the power transmission coil 65.

In Embodiment 1, the resonance frequency of the magnetic resonance is a frequency in a MHz band. For example, the driving frequency of the drive circuit 50 ranges from equal to or more than 20 kHz to less than 100 kHz, and the resonance frequency of the magnetic resonance is 6.78 MHz or a frequency that is an integral multiple of 6.78 MHz.

Thus, as the resonance frequency of the power transmission by magnetic resonance is largely different from the frequency of the coil current flowing through the heating coil 11a, the power transmission from the main body 100 to the power-receiver device 200 is not affected by the magnetic field generated by the coil current flowing through the heating coil 11a. Consequently, the electric power can be stably transmitted regardless of the magnitude of the coil current, that is, the magnitude of the electric power to be input.

The conductor (metal) placed on the top plate 4 is not inductively heated by the magnetic field generated from the power transmission coil 65. Even when the metal cooker, for example, is placed on the top plate 4, the metal cooker is not inductively heated by the magnetic field generated from the power transmission coil 65.

As the resonance frequency of the magnetic resonance is extremely higher than the frequency of the high-frequency current flowing through the heating coil 11a, the inductance of the power transmission coil 65 can be extremely smaller than that of the heating coil 11a. Consequently, it is not necessary to provide a magnetic material such as ferrite to the power transmission coil 65. Consequently, the size of the main body 100 can be reduced, thereby obtaining an inexpensive inductive heating cooker.

In Embodiment 1, the power-receiver device 200 includes the power-receiver communication device 85 configured to transmit the information on the temperature detected by the temperature sensor 90 configured to detect the temperature of the heating target 5. The main body 100 includes the main-body communication device 47 configured to receive the information on the temperature transmitted from the power-receiver communication device 85, and the control unit 45 configured to control the driving of the drive circuits 50 depending on the information on the temperature.

Thus, the restriction on an installation position of the temperature sensor 90 configured to detect the temperature of the heating target 5 can be alleviated, thereby increasing the degree of freedom in the installation position of the temperature sensor 90 to be placed on the top plate 4. Consequently, the installation position of the temperature sensor 90 can be changed arbitrarily depending on, for example, the shape and size of the heating target 5. Consequently, the usability can be improved.

Even when the temperature sensor 90 is made of a contact type sensor such as a thermistor, for example, and the power-receiver device 200 is provided to contact the side surface of the heating target 5, the power transmission from the main body 100 to the power-receiver device 200 is not affected by the magnetic field generated by the coil current flowing through the heating coil 11a.

Consequently, the temperature of the side surface of the heating target 5 can be directly detected by directly attaching the temperature sensor 90 to the side surface of the heating target 5, and thus to obtain an inductive heating cooker with high temperature detection accuracy.

In a case in which the electric power is transmitted using the electromagnetic induction coupling, for example, when the power-receiver device is attached to the side surface of the metal heating target, the magnetic flux produced by the electromagnetic induction interlinks with the metal portion of the side surface of the heating target, thereby screening the magnetic field, so that the electric power cannot be transmitted.

On the other hand, in the inductive heating cooker of Embodiment 1, the electric power is transmitted by magnetic resonance, and consequently the power transmission is hardly affected by the metal portion of the heating target 5, which enables the power transmission.

Modified Example 1

Figure 7:
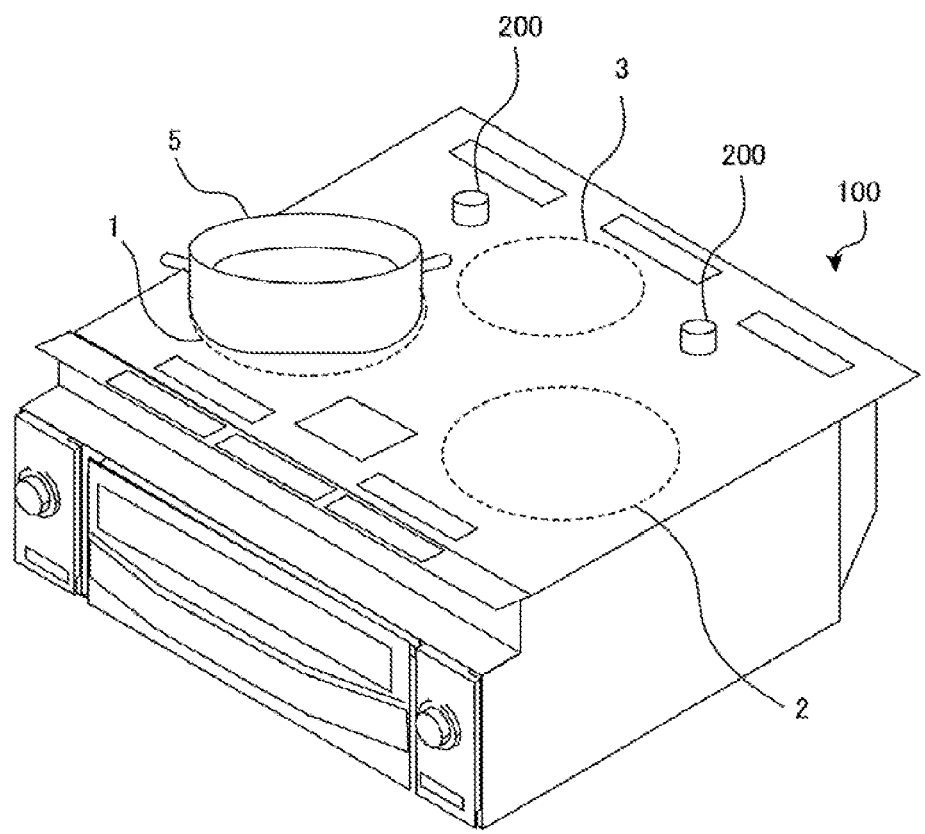
FIG. 7 is a perspective view illustrating Modified Example 1 of power power-receiver devices of the inductive heating cooker according to Embodiment 1.

FIG. 7 is a perspective view illustrating Modified Example 1 of power-receiver devices of the inductive heating cooker according to Embodiment 1.

As illustrated in FIG. 7, a configuration provided with a plurality of power-receiver devices 200 may be employed. In such a configuration, the plurality of power-receiver devices 200 each receive the electric power from one power transmission coil 65.

The power-receiver control units 83 of the plurality of power-receiver devices 200 cause the respective temperature sensors 90 to transmit the information on the temperatures acquired from the respective temperature sensors 90 to the respective power-receiver communication devices 85. The control unit 45 of the main body 100 acquires the information on the temperature from each of the plurality of power-receiver devices 200, and controls driving of the drive circuits 50 using the information on a plurality of temperatures.

For example, the temperature sensors 90 of the plurality of the power-receiver devices 200 detect the temperature of one heating target 5. The control unit 45 calculates the average temperature, the maximum temperature, or the minimum temperature on the basis of the received information on the plurality of temperatures, and controls the driving of the drive circuits 50 on the basis of the calculated values.

For example, a plurality of power-receiver devices 200 may be provided for the respective heating areas. The power-receiver control units 83 of the plurality of power-receiver devices 200 cause the respective temperature sensors 90 to transmit the identification information indicating the heating areas in addition to the information on the temperatures acquired from the respective temperature sensors 90 to the respective power-receiver communication devices 85. The control unit 45 of the main body 100 acquires the information on the temperature from each of the plurality of power-receiver devices 200 together with the identification information. The control unit 45 acquires the temperatures of the heating targets 5 placed on the respective heating areas on the basis of the received information on the plurality of temperatures, and controls the driving of the drive circuits 50 of the respective heating units.

As described above, providing the plurality of power-receiver devices 200 each having the temperature sensor 90 enables the accuracy in detection of the temperature to be enhanced and the temperature variation of the heating target 5 to be reduced, and thus to obtain an inductive heating cooker with excellent usability. Also in a case in which the plurality of heating targets 5 are simultaneously heated, the temperature of each of the heating targets 5 can be simultaneously detected, and thus an inductive heating cooker with excellent usability can be obtained.

Modified Example 2

Figure 8:
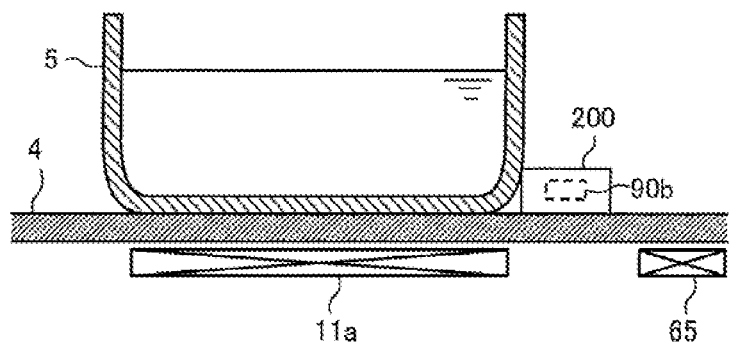
FIG. 8 is a schematic diagram illustrating Modified Example 2 of a power-receiver device of the inductive heating cooker according to Embodiment 1.

FIG. 8 is a schematic diagram illustrating Modified Example 2 of a power-receiver device of the inductive heating cooker according to Embodiment 1.

As illustrated in FIG. 8, a vibration sensor 90b may be provided as a load circuit of a power-receiver device 200. Note that the power-receiver device 200 may be provided with the vibration sensor 90b instead of the above-described temperature sensor 90, or may be provided with the vibration sensor 90b in addition to the temperature sensor 90.

The vibration sensor 90b is operated by the electric power supplied from the power reception circuit 81. The vibration sensor 90b detects the vibration from a measurement target.

Note that the vibration sensor 90b corresponds to the "load circuit" in the present invention.

In such a configuration, the power-receiver device 200 is provided to contact the side surface of the heating target 5, so that the vibration sensor 90b detects the vibration of the heating target 5. When the water in the heating target 5 is heated, and the water boils, for example, the vibration of the heating target 5 changes due to a burst of water bubbles. The vibration sensor 90b outputs a voltage signal corresponding to the detected vibration to the power-receiver control unit 83.

The power-receiver control unit 83 of the power-receiver device 200 causes the vibration sensor 90b to transmit the information on vibration acquired from the vibration sensor 90b to the power-receiver communication device 85. The control unit 45 of the main body 100 controls driving of the drive circuits 50 using the information on the vibration acquired from the power-receiver device 200.

When an amount of change in vibration detected by the vibration sensor 90*b* exceeds a threshold, for example, the control unit 45 determines that the water in the heating target 5 has boiled. When the control unit 45 determines that the water has boiled, the control unit 45 controls the input heating power in such a manner that the input heating power is reduced. The control unit 45 may issue a notification on the display-and-operation unit 43 that the water has boiled.

Thus, providing the vibration sensor 90*b* enables the detection of boiling. The boiling state can be maintained even when the heating power to be input (electric power to be input) is reduced after boiling, and consequently the electric power to be input can be reduced. Reduction in the electric power to be input can decrease the wasteful consumption of electric power, and thus to obtain an inductive heating cooker that achieves electric power saving.

Modified Example 3

Figure 9:
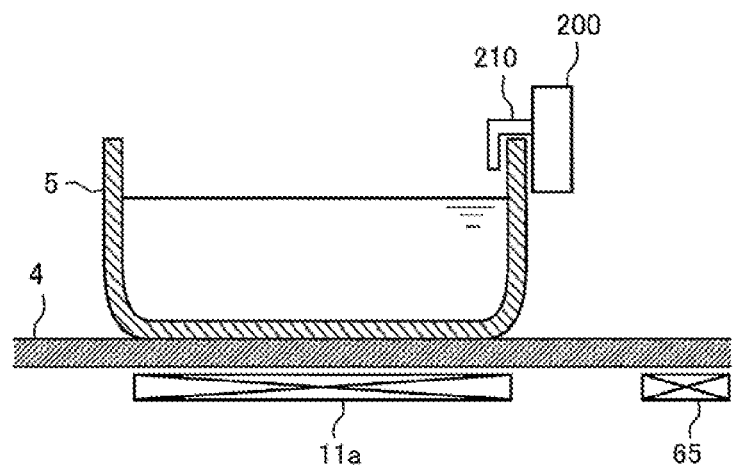
FIG. 9 is a schematic diagram illustrating Modified Example 3 of a power-receiver device of the inductive heating cooker according to Embodiment 1.

FIG. 9 is a schematic diagram illustrating Modified Example 3 of a power-receiver device of the inductive heating cooker according to Embodiment 1.

As illustrated in FIG. 9, the power-receiver device 200 may be provided with a holding unit 210 configured to hold the power-receiver device 200 at the side surface of the heating target 5.

As described above, comparing the power transmission using the magnetic resonance method (resonant coupling type) with the power transmission using the electromagnetic induction method (electromagnetic induction coupling type), the distance between the power transmission coil 65 and the power reception coil 80 can be increased.

Consequently, as illustrated in FIG. 9, the electric power can be transmitted even when the power-receiver device 200 is provided above the top plate 4 (to be lifted up from the top plate), and thus to obtain an inductive heating cooker with excellent usability.

Embodiment 2

In Embodiment 2, a configuration provided with a display-and-operation unit 43 serving as a load circuit of the power-receiver device will be described below.

Note that in the following description, the same parts as those of Embodiment 1 described above will be denoted by the same reference signs, and the differences from Embodiment 1 will be mainly described.

Figure 10:
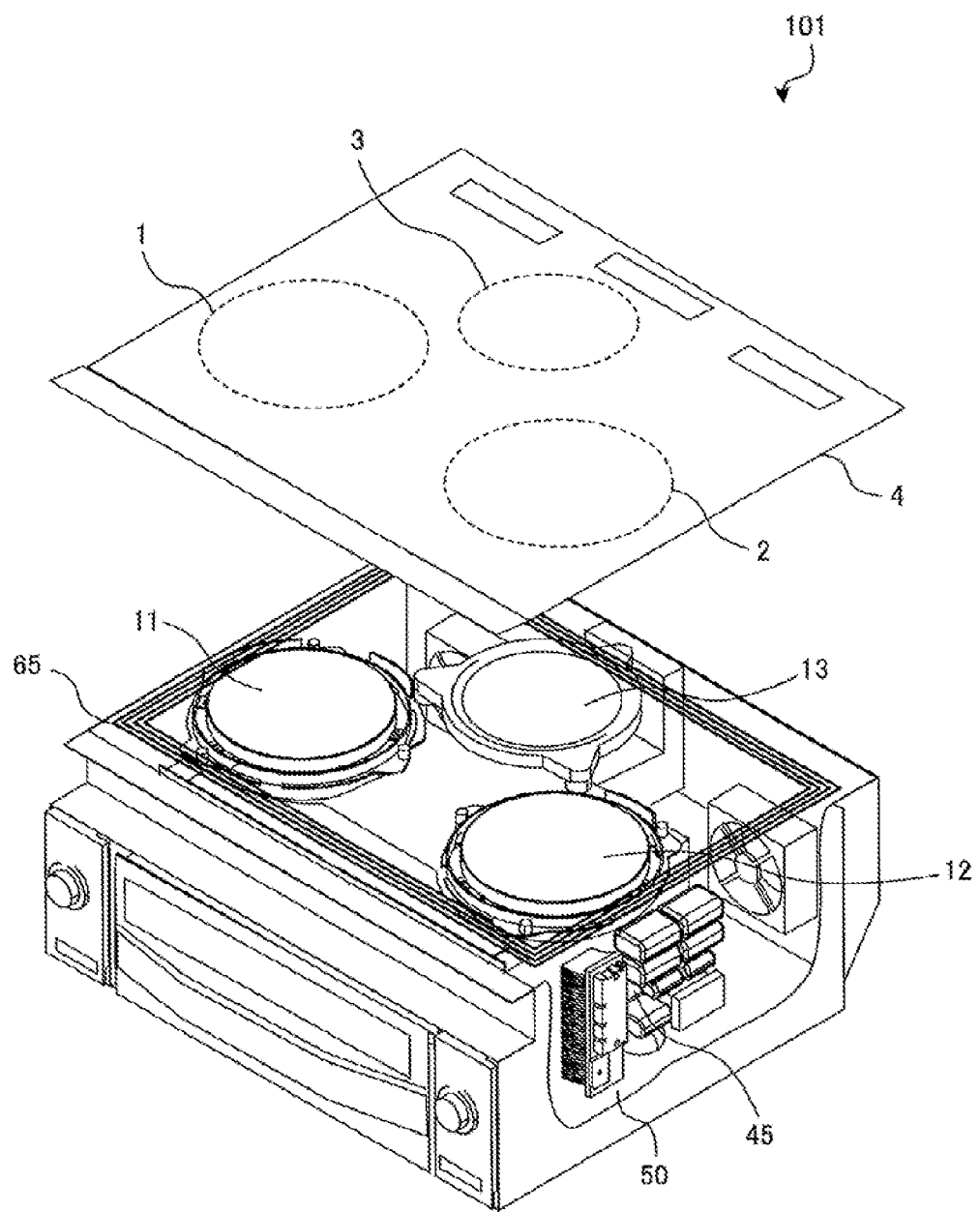
FIG. 10 is an exploded perspective view illustrating a main body of an inductive heating cooker according to Embodiment 2.

FIG. 10 is an exploded perspective view illustrating a main body of an inductive heating cooker according to Embodiment 2.

Figure 11:
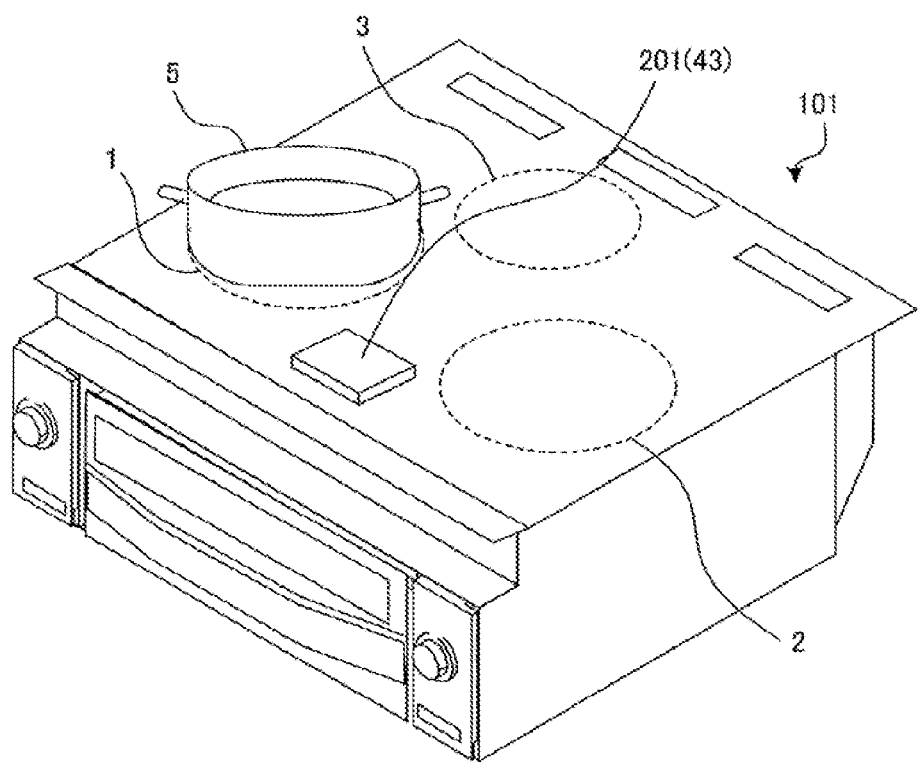
FIG. 11 is a perspective view illustrating the main body and a power-receiver device of the inductive heating cooker according to Embodiment 2.

FIG. 11 is a perspective view illustrating the main body and a power-receiver device of the inductive heating cooker according to Embodiment 2.

Figure 12:
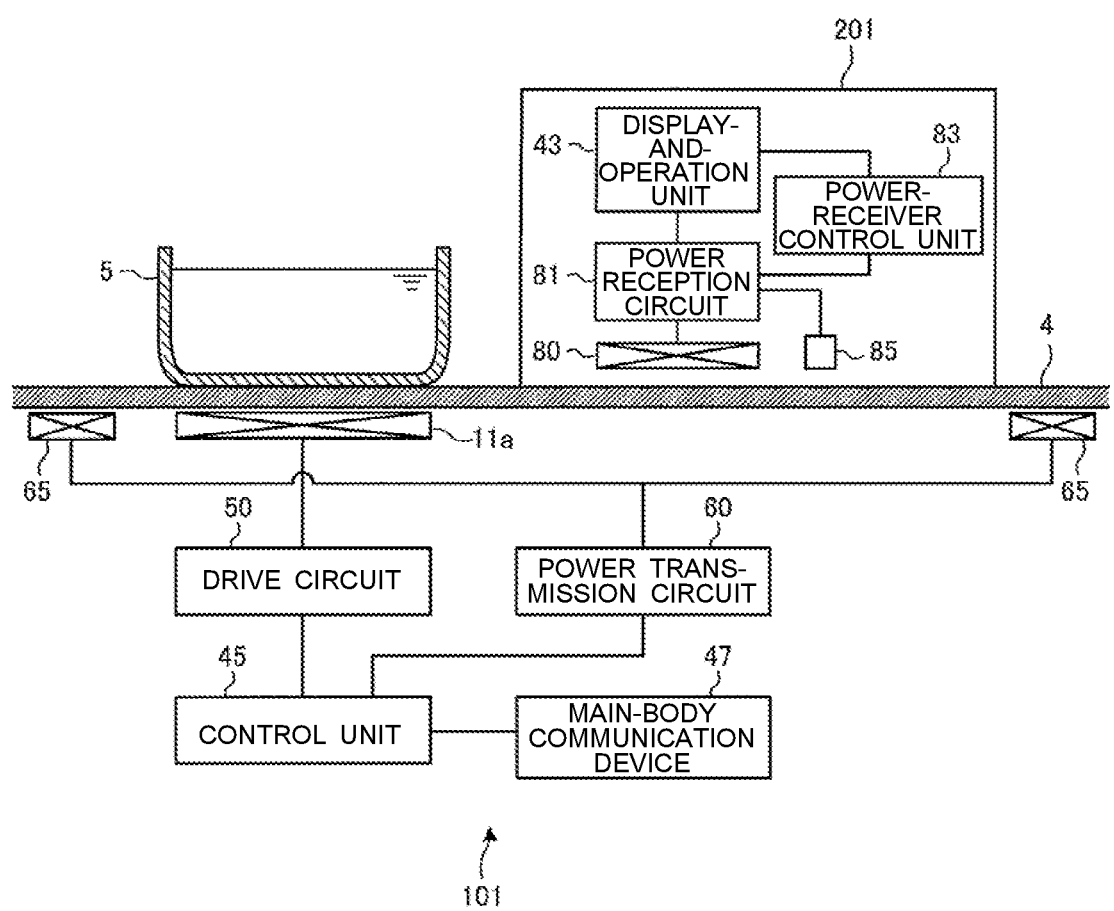
FIG. 12 is a block diagram illustrating a configuration of the main body and the power-receiver device of the inductive heating cooker according to Embodiment 2.

FIG. 12 is a block diagram illustrating a configuration of the main body and the power-receiver device of the inductive heating cooker according to Embodiment 2.

As illustrated in FIG. 10 to FIG. 12, a main body 101 of the inductive heating cooker according to Embodiment 2 does not include the operation unit 40, the display unit 41, and the display-and-operation unit 43 configured in such a manner that the operation unit 40 and the display unit 41 are integrated. The other configurations of the main body 101 are similar to those of the main body 100 of Embodiment 1 described above.

A power-receiver device 201 of the inductive heating cooker according to Embodiment 2 includes the display-and-operation unit 43 serving as a load circuit.

The display-and-operation unit 43 of the power-receiver device 201 is operated by the electric power supplied from the power reception circuit 81. The display-and-operation unit 43 is configured in such a manner that the operation unit 40 for receiving information on operation input to the main body 101 of the inductive heating cooker and the display unit 41 for displaying the information on the operation of the main body 101 are integrated. The other configurations of the power-receiver device 201 are similar to those of the power-receiver device 200 of Embodiment 1 described above.

Note that the operation unit 40, the display unit 41, and the display-and-operation unit 43 in Embodiment 2 each correspond to the "load circuit" in the present invention.

In such a configuration, the power-receiver control unit 83 causes the display-and-operation unit 43 to transmit the information on the input operation received by the display-and-operation unit 43 to the power-receiver communication device 85. The information on this input operation is, for example, information on setting of heating power to be input (electric power to be input) and a cooking menu when the heating target 5 is heated.

The control unit 45 of the main body 101 controls the driving of the drive circuits 50 depending on the information on the input operation received by the main-body communication device 47.

The control unit 45 transmits the display information on the operation of the main body 101 to the main-body communication device 47. The power-receiver control unit 83 of the power-receiver device 201 causes the display-and-operation unit 43 to display the display information received by the power-receiver communication device 85. This display information is, for example, information on setting of heating power to be input (electric power to be input) and a cooking menu when the heating target 5 is heated and information on the operation state.

As described above, in Embodiment 2, the power-receiver device 201 includes the display-and-operation unit 43 configured in such a manner that the operation unit 40 for receiving information on operation input to the main body 101 of the inductive heating cooker and the display unit 41 for displaying the information on the operation of the main body 101 are integrated.

Consequently, in addition to the effects of Embodiment 1 described above, it is possible to increase the degree of freedom in the installation position of the display-and-operation unit 43 and improve the usability.

Furthermore, the main body 101 does not include the operation unit 40, the display unit 41, and the display-and-operation unit 43 configured in such a manner that the operation unit 40 and the display unit 41 are integrated, thereby capable of simplifying the configuration of the main body 101 and achieving downsizing.

Note that in Embodiment 2, the configuration in which the power-receiver device 201 includes the display-and-operation unit 43 configured in such a manner that the operation unit 40 and the display unit 41 are integrated has been described, but the present invention is not limited to the configuration described above. Only one of the operation unit 40 and the display unit 41 may be provided in the power-receiver device 201.

In Embodiment 2, the configuration in which the main body 101 does not include the operation unit 40, the display unit 41, and the display-and-operation unit 43 has been described, but the present invention is not limited to the configuration described above. Only one of the operation unit 40 and the display unit 41 may be provided in the main body 101. Both the operation unit 40 and the display unit 41 may be provided in each of the main body 101 and the power-receiver device 201. A part of the operation unit 40 and the display unit 41 may be provided.

Modified Example

Figure 13:
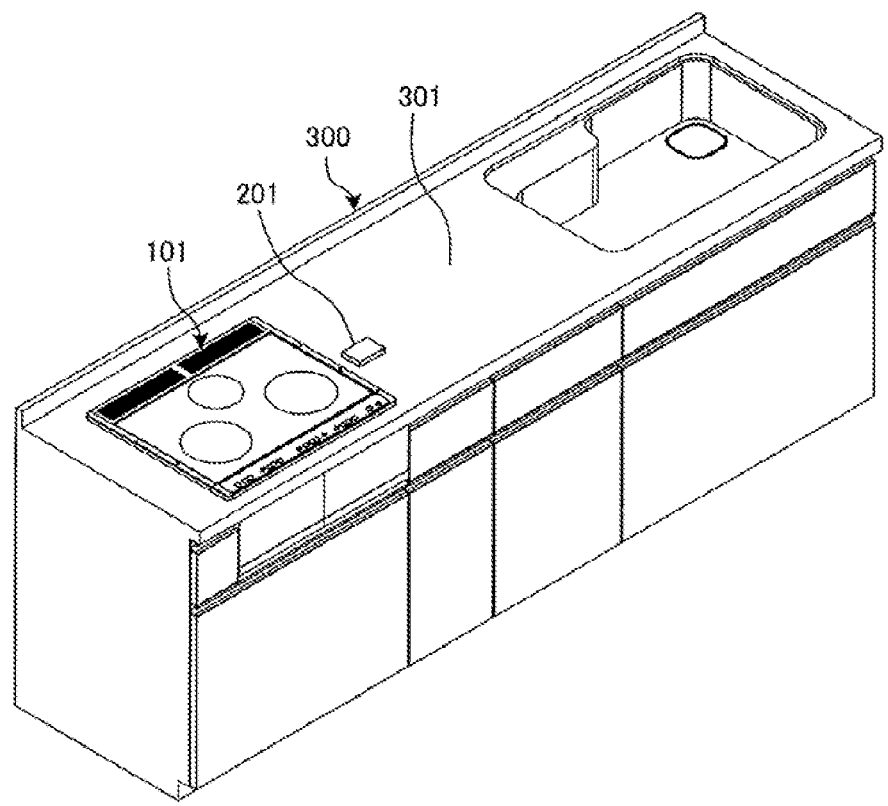
FIG. 13 is a perspective view illustrating Modified Example of a power-receiver device of the inductive heating cooker according to Embodiment 2.

FIG. 13 is a perspective view illustrating Modified Example of a power-receiver device of the inductive heating cooker according to Embodiment 2.

As illustrated in FIG. 13, the main body 101 of the inductive heating cooker is installed in a kitchen 300 provided with, for example, a sink. A housing portion (not illustrated) to which the main body 101 of the inductive heating cooker is fitted is formed in the kitchen 300, and a flat-plate shaped workboard 301 is provided on a top surface of the kitchen 300. The top plate 4 of the inductive heating cooker is exposed from the workboard 301 in a state where the main body 101 of the inductive heating cooker is incorporated in the kitchen 300. The workboard 301 of the kitchen 300 is made of insulating (non-metallic) materials such as wood, synthetic resin (for example, an artificial marble), and a stone material, for example.

In such a configuration, the power-receiver device 201 having the display-and-operation unit 43 may be placed on the workboard 301 of the kitchen 300.

As the electric power is transmitted to the power-receiver device 201 from the main body 101 of the inductive heating cooker by magnetic resonance, the electric power can be transmitted even when the power transmission coil 65 and the power reception coil 80 are not arranged to face each other. As the workboard 301 is made of insulating materials, the power transmission coil 65 is not screened from the power reception coil 80.

Consequently, the electric power can be transmitted from the main body 101 even when the power-receiver device 201 is placed on the workboard 301. Consequently, the operation and display of the display-and-operation unit 43 can be performed in a state where the power-receiver device 201 is placed on the workboard 301, thereby improving the usability of the inductive heating cooker.

Embodiment 3

In Embodiment 3, a configuration in which a heater is provided as a load circuit of the power-receiver device will be described below.

Note that in the following description, the same parts as those of Embodiment 1 described above will be denoted by the same reference signs, and the differences from Embodiment 1 will be mainly described.

Figure 14:
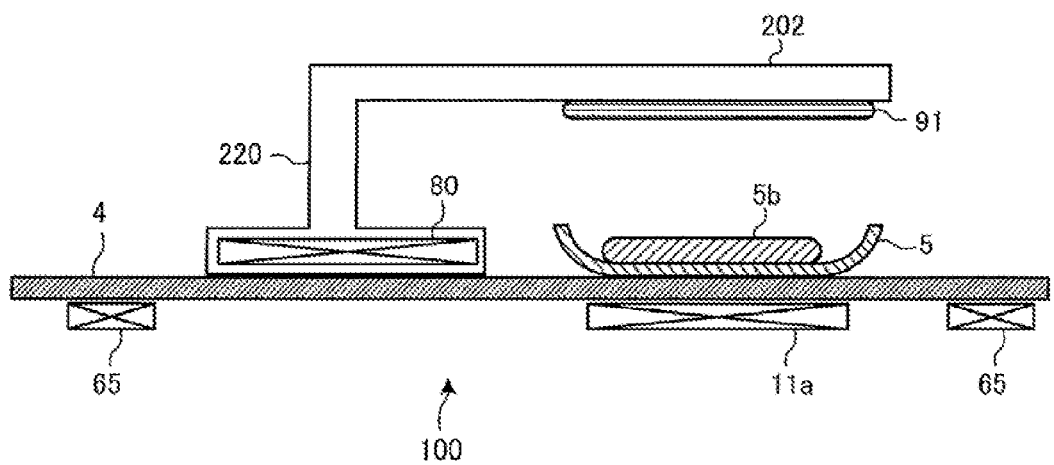
FIG. 14 is a schematic diagram illustrating a configuration of an inductive heating cooker according to Embodiment 3.

FIG. 14 is a schematic diagram illustrating a configuration of an inductive heating cooker according to Embodiment 3.

Note that FIG. 14 schematically illustrates a longitudinal section of the main body 100 and the power-receiver device 202 viewed from the fronts of the main body 100 and the power-receiver device 202.

As illustrated in FIG. 14, the power-receiver device 202 of the inductive heating cooker according to Embodiment 3 includes an upper heater 91 serving as a load circuit.

The upper heater 91 is connected to the power reception coil 80 via the power reception circuit 81 (not illustrated). The upper heater 91 is made of a heating element that generates heat by the electric power received by the power reception coil 80. For example, a sheathed heater serving as a resistance heating element is employed as the upper heater 91. A specific configuration of the upper heater 91 is not limited to the one described above, and a given heating element such as a halogen heater and a far-infrared heater may be employed. The upper heater 91 is supported above the heating target 5 by a supporting unit 220.

The supporting unit 220 is formed by a casing serving as an outer shell of the power-receiver device 202, for example. The supporting unit 220 is formed to extend upward from the bottom portion that houses the power reception coil 80 and then extend horizontally, thereby having an L-shaped cross section. More specifically, the supporting unit 220 supports the upper heater 91 so that the upper heater 91 is located above the heating coil 11*a* and the heating target 5 when the power-receiver device 202 is placed on the top plate 4.

Note that when the power-receiver device 202 is placed on the top plate 4, the distance between the top plate 4 and the upper heater 91 is set to be larger than the height of a pod or a frying pan considered as the heating target 5. Note that the supporting unit 220 may be configured to move the upper heater 91 up and down.

Note that the upper heater 91 in Embodiment 3 corresponds to a "load circuit" in the present invention.

In such a configuration, the control unit 45 of the main body 100 operates the power transmission circuit 60 and causes the power transmission circuit 60 to start the supply of electric power to the power transmission coil 65. The electric power is thereby supplied to the power reception coil 80 of the power-receiver device 200 from the power transmission coil 65 by magnetic resonance. The electric power received by the power reception coil 80 is supplied to the upper heater 91 from the power reception circuit 81.

The upper heater 91 thereby heats food 5*b* in the heating target 5 from above by thermal radiation. More specifically, the cooking by inductive heating and the cooking through non-contact power transmission can be simultaneously performed. Furthermore, the cooking by inductive heating and the cooking through non-contact power transmission are independently controllable. Consequently, it is possible to obtain an inductive heating cooker with which food can be nicely cooked in a short time. That is, with the drive circuits 50 and the power transmission circuit 60, it is possible to independently control inductive heating with the heat from the heating target 5 and upper heating by the upper heater 91, and thus to obtain an inductive heating cooker with which food can be nicely cooked in a short time.

Embodiment 4

In Embodiment 4, a configuration in which a stirring device is provided as a load circuit of the power-receiver device will be described below.

Note that in the following description, the same parts as those of Embodiment 1 described above will be denoted by the same reference signs, and the differences from Embodiment 1 will be mainly described.

Figure 15:
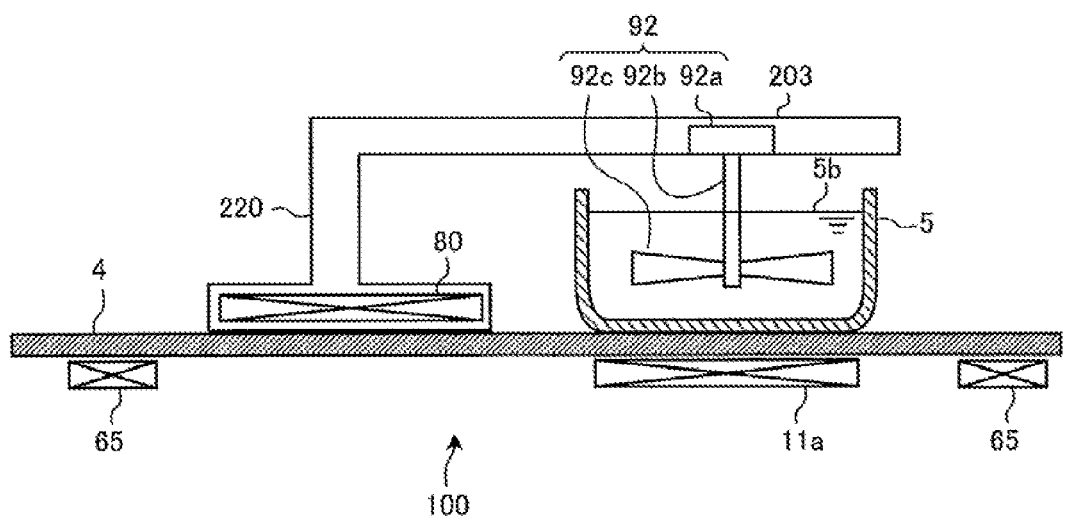
FIG. 15 is a schematic diagram illustrating a configuration of an inductive heating cooker according to Embodiment 4.

FIG. 15 is a schematic diagram illustrating a configuration of an inductive heating cooker according to Embodiment 4.

Note that FIG. 15 schematically illustrates a longitudinal section of the main body 100 and a power-receiver device 203 viewed from of the fronts of the main body 100 and the power-receiver device 203.

As illustrated in FIG. 15, the power-receiver device 203 of the inductive heating cooker according to Embodiment 4 includes a stirring device 92 serving as a load circuit.

The stirring device 92 includes a motor 92a, a shaft 92b, and a blade unit 92c. The stirring device 92 is supported above the heating target 5 by the supporting unit 220. When the heating target 5 such as a pot and a frying pan, containing the food 5b, such as stew and fried food, for example, is placed on one of the heating areas of the top plate 4, the blade unit 92c of the stirring device 92 is placed in the heating target 5.

The motor 92a is provided to an upper portion of the casing of the power-receiver device 203, for example, and is driven for rotation by the electric power received by the power reception coil 80. The shaft 92b has a rotary shaft disposed in the vertical direction, and has one end connected to the motor 92a to transmit drive force of the motor 92a. The blade unit 92c is attached to the shaft 92b, and stirs the food 5b with the shaft 92b driven for rotation.

Note that the stirring device 92 in Embodiment 4 corresponds to a "load circuit" in the present invention.

In such a configuration, the control unit 45 of the main body 100 operates the power transmission circuit 60 and causes the power transmission circuit 60 to start the supply of electric power to the power transmission coil 65. The electric power is thereby supplied to the power reception coil 80 of the power-receiver device 200 from the power transmission coil 65 by magnetic resonance. The electric power received by the power reception coil 80 is supplied to the stirring device 92 from the power reception circuit 81.

The cooking by induction heating and cooking by stirring through non-contact power transmission can thus be simultaneously performed. Furthermore, the cooking by induction heating and the cooking by stirring through non-contact power transmission are independently controllable. Consequently, it is possible to obtain an inductive heating cooker with which food can be nicely cooked in a short time.

Note that in Embodiments 1 to 4 described above, a configuration in which the power-receiver device has one type of load circuit has been described, but a plurality of load circuits of Embodiments 1 to 4 may be used in combination. That is, a plurality of power-receiver devices are provided, and at least one of the plurality of power-receiver devices may have a load circuit different from the load circuit each in other ones of the plurality of power-receiver devices.

The load circuit of the power-receiver device is not limited to the examples of Embodiments 1 to 4 described above, and may be a cooking device (a fryer, a steamer, a roaster, a toaster, and other devices) used for cooking the food, for example. Furthermore, the load circuit of the power-receiver device may be the cooking device (a blender, a mixer, a mill, a beater, a food processor, and other devices) used for preparing and precooking the food, for example. Moreover, the load circuit of the power-receiver device may be a component detection sensor for detecting components (for example, salinity, sugar content, and other components), the component detection sensor being disposed in the heating target 5.

Embodiment 5

Figure 16:
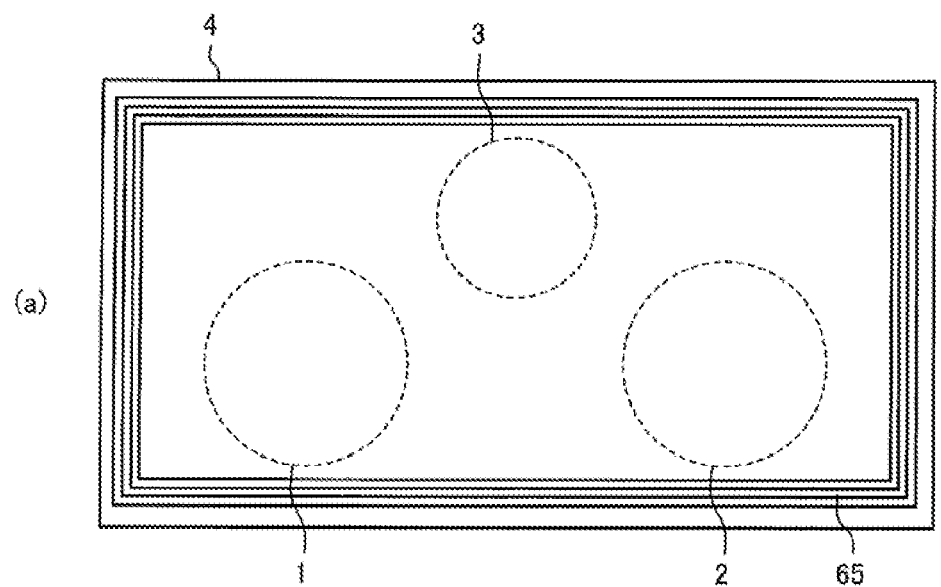
FIG. 16 is a diagram illustrating a top plate and a power transmission coil of an inductive heating cooker according to Embodiment 5.
Figure 16:
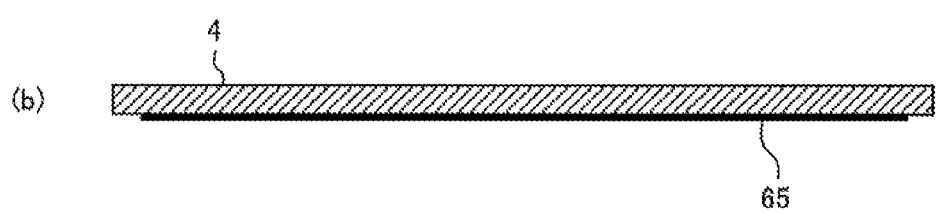

FIG. 16 is a diagram illustrating a top plate and a power transmission coil of an inductive heating cooker according to Embodiment 5.

FIG. 16(a) is a plan view of the top plate 4 when the top plate 4 is seen from the back, and FIG. 16(b) is a side view of the top plate 4.

As illustrated in FIG. 16, the power transmission coil 65 may be provided on the back surface (bottom surface) of the top plate 4. For example, the power transmission coil 65 may be provided on the back surface of the top plate 4 by printed wiring.

With such a configuration, the main body 100 can be miniaturized. The assembling process of the main body 100 can be facilitated, and thus to obtain an inexpensive inductive heating cooker.

REFERENCE SIGNS LIST 1 first heating area 2 second heating area 3 third heating area 4 top plate 5 heating target 5b food 11 first heating unit 11a heating coil 12 second heating unit 13 third heating unit 21 alternating-current power supply 22 direct-current power supply circuit 22a diode bridge 22b reactor 22c smoothing capacitor 23 inverter circuit 23a IGBT 23b IGBT 23c diode 23d diode 24 resonant capacitor 25 input current detecting unit 26 coil current detecting unit 40 operation unit 40a operation unit 40b operation unit 40c operation unit 41 display unit 41a display unit 41b display unit 41c display unit 43 display-and-operation unit 45 control unit 47 main-body communication device 50 drive circuit 60 power transmission circuit 60a resonance type power supply 60b matching circuit 65 power transmission coil 80 power reception coil 81 power reception circuit 81a rectifier circuit 81b conversion circuit 83 power-receiver control unit 85 power-receiver communication device 90 temperature sensor 90b vibration sensor 91 upper heater 92 stirring device 92a motor 92b shaft 92c blade unit 100 main body 101 main body 200 power-receiver device 201 power-receiver device 202 power-receiver device 203 power-receiver device 210 holding unit 220 supporting unit 300 kitchen 301 workboard

The invention claimed is:

1. An inductive heating cooker, comprising:
a main body; and
a power-receiver device,
the main body including
  a top plate on which a heating target is placed,
  a heating coil provided under the top plate and configured to inductively heat the heating target,
  a drive circuit configured to supply electric power to the heating coil,
  a power transmission coil configured to transmit the electric power by magnetic resonance, and
  a power transmission circuit configured to supply the electric power to the power transmission coil,
the power-receiver device including
  a power reception coil configured to receive the electric power from the power transmission coil by the magnetic resonance, and
  a load circuit configured to operate by the electric power received by the power reception coil,
the power transmission coil being provided to surround the heating coil in a plan view, and
the power-receiver device being placed on the top plate and being allowed to be detached from the top plate.

2. The inductive heating cooker of claim 1, wherein a plurality of the power-receiver devices are provided, and each of the plurality of the power-receiver devices is configured to receive the electric power from the power transmission coil.

3. The inductive heating cooker of claim 1, wherein a resonance frequency of the magnetic resonance is a frequency in a MHz band.

4. The inductive heating cooker of claim 3, wherein
a driving frequency of the drive circuit ranges from equal to or more than 20 kHz to less than 100 kHz, and
the resonance frequency of the magnetic resonance is 6.78 MHz or a frequency that is an integral multiple of 6.78 MHz.

5. The inductive heating cooker of claim 1, wherein
the load circuit comprises a temperature sensor configured to detect a temperature of the heating target,
the power-receiver device includes a first communication device configured to transmit information on the temperature detected by the temperature sensor, and
the main body includes
a second communication device configured to receive the information on the temperature transmitted from the first communication device, and
a controller configured to control driving of the drive circuit depending on the information on the temperature.

6. The inductive heating cooker of claim 1, wherein
the load circuit comprises a vibration sensor configured to detect a vibration of the heating target,
the power-receiver device includes a first communication device configured to transmit information on the vibration detected by the vibration sensor, and
the main body includes
a second communication device configured to receive the information on the vibration transmitted from the first communication device, and
a controller configured to control driving of the drive circuit depending on the information on the vibration.

7. The inductive heating cooker of claim 1, wherein
the load circuit comprises an operation unit configured to receive information on operation input to the main body,
the power-receiver device includes a first communication device configured to transmit the information on the input operation received by the operation unit, and
the main body includes
a second communication device configured to receive the information on the input operation transmitted from the first communication device, and
a controller configured to control driving of the drive circuit depending on the information on the input operation.

8. The inductive heating cooker of claim 1, wherein
the load circuit comprises a display unit configured to display information on an operation of the main body,
the power-receiver device includes a first communication device configured to receive the information to be displayed on the display unit, and
the main body includes a second communication device configured to transmit the information to be displayed on the display unit.

9. The inductive heating cooker of claim 1, wherein the load circuit comprises a heater configured to generate heat by the electric power received by the power reception coil to heat the heating target.

10. The inductive heating cooker of claim 1, wherein the load circuit comprises a stirring device configured to be driven for rotation by the electric power received by the power reception coil to stir food contained in the heating target.

11. The inductive heating cooker of claim 1, wherein
a plurality of the power-receiver devices are provided, and
at least one of the plurality of the power-receiver devices has a load circuit different from the load circuit each in other ones of the plurality of the power-receiver devices.

12. The inductive heating cooker of claim 1, wherein the power-receiver device includes a holding unit configured to hold the power-receiver device at a side surface of the heating target.

13. An inductive heating cooker, comprising:
a main body; and
a power-receiver device,
the main body including
a top plate on which a heating target is placed,
a plurality of heating coils provided under the top plate and each configured to inductively heat the heating target,
a drive circuit configured to supply electric power to the plurality of heating coils,
a power transmission coil configured to transmit the electric power by magnetic resonance, and
a power transmission circuit configured to supply the electric power to the power transmission coil,
the power-receiver device including
a power reception coil configured to receive the electric power from the power transmission coil by the magnetic resonance, and
a load circuit configured to operate by the electric power received by the power reception coil,
the power transmission coil being provided to surround the plurality of heating coils in a plan view, and
the power-receiver device being placed on the top plate and being allowed to be detached from the top plate.

14. An inductive heating cooker, comprising:
a main body; and
a power-receiver device,
the main body including
a top plate on which a heating target is placed,
a heating coil provided under the top plate and configured to inductively heat the heating target,
a drive circuit configured to supply electric power to the heating coil,
a power transmission coil configured to transmit the electric power by magnetic resonance, and
a power transmission circuit configured to supply the electric power to the power transmission coil,
the power-receiver device including
a power reception coil configured to receive the electric power from the power transmission coil by the magnetic resonance, and
a load circuit configured to operate by the electric power received by the power reception coil,
the power transmission coil being provided under the top plate and along an edge of the top plate, and
the power-receiver device being placed on the top plate and being allowed to be detached from the top plate.

* * * * *